(12) United States Patent
Lu et al.

(10) Patent No.: US 9,545,603 B2
(45) Date of Patent: Jan. 17, 2017

(54) COMPOSITE MEMBRANES

(75) Inventors: Yun Lu, Nanjing (CN); Zhiquan Shi, Nanjing (CN); Hui Zhou, Nanjing (CN); Tingyang Dai, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 28 days.

(21) Appl. No.: 13/505,715

(22) PCT Filed: Dec. 14, 2010

(86) PCT No.: PCT/CN2010/079777
§ 371 (c)(1),
(2), (4) Date: May 2, 2012

(87) PCT Pub. No.: WO2012/079229
PCT Pub. Date: Jun. 21, 2012

(65) Prior Publication Data
US 2012/0255897 A1 Oct. 11, 2012

(51) Int. Cl.
*B01D 71/06* (2006.01)
*B01D 69/02* (2006.01)
(Continued)

(52) U.S. Cl.
CPC ............... *B01D 69/02* (2013.01); *B01D 69/12* (2013.01); *B01D 71/30* (2013.01); *B01D 71/82* (2013.01);
(Continued)

(58) Field of Classification Search
CPC ... B01D 63/06; B01D 63/061; B01D 67/0006; B01D 67/0088; B01D 67/0093; B01D 69/02; B01D 69/06; B01D 69/10; B01D 69/12; B01D 69/125; B01D 71/30; B01D 71/32; B01D 71/34; B01D 71/82; B01D 2323/30; B01D 2323/02; B01D 2323/26; B01D 2323/36; B01D 2325/26
(Continued)

(56) References Cited

U.S. PATENT DOCUMENTS

2006/0201874 A1* 9/2006 Klare et al. ............. 210/500.36
2009/0001009 A1 1/2009 Linder et al.

FOREIGN PATENT DOCUMENTS

| CN | 101422703 A | 5/2009 |
| EP | 1466934 | * 10/2004 |
| JP | 60069140 A | 4/1985 |

OTHER PUBLICATIONS

Sophie Tan and and Daniel Bélanger, 1.Characterization and Transport Properties of Nafion/Polyaniline Composite Membranes; The Journal of Physical Chemistry B Nov. 18, 2005 109 (49), pp. 23480-23490.*

(Continued)

*Primary Examiner* — David C Mellon
*Assistant Examiner* — Pranav Patel
(74) *Attorney, Agent, or Firm* — Dorsey & Whitney LLP

(57) ABSTRACT

Composite membranes, methods or processes for producing composite membranes, and systems utilizing composite membranes are generally described. In some examples, a composite membrane includes a porous halogenated polymer and a conductive polymer coupled to the porous halogenated polymer. In some examples, a process for producing a composite membrane includes coupling a conductive polymer and a porous halogenated polymer.

12 Claims, 3 Drawing Sheets

(51) Int. Cl.
  *B01D 69/12* (2006.01)
  *B01D 71/30* (2006.01)
  *B01D 71/82* (2006.01)

(52) U.S. Cl.
  CPC ....... *B01D 2323/02* (2013.01); *B01D 2323/26* (2013.01); *B01D 2323/30* (2013.01); *B01D 2323/36* (2013.01)

(58) Field of Classification Search
  USPC .............. 210/500.1, 500.21, 500.27, 500.28, 210/500.33, 504, 506
  See application file for complete search history.

(56) References Cited

OTHER PUBLICATIONS

Fuoiang Liu, Baolian Yi, Danmin Xing, Jingrong Yu, Huamin Zhang, Nafion/PTFE composite membranes for fuel cell applications, Journal of Membrane Science, vol. 212, Issues 1-2, Feb. 15, 2003, pp. 213-223.*

Jinyan Yang, Pei Kang Shen, John Varcoe, Zidong Wei, Nafion/polyaniline composite membranes specifically designed to allow proton exchange membrane fuel cells operation at low humidity, Journal of Power Sources, vol. 189, Issue 2, Apr. 15, 2009, pp. 1016-1019.*

S. Bhadra et al., Polyaniline by new miniemulsion polymerization and the effect of reducing agent on conductivity, Synthetic Metals 156 (2006) 1148-1154.*

Hussein Gharibi, Mohammad Zhiani, Rasol Abdullah Mirzaie, Mehdi Kheirmand, Ali Akbar Entezami, Karim Kakaei, Masumeh Javaheri, Investigation of polyaniline impregnation on the performance of gas diffusion electrode (GDE) in PEMFC using binary of Nafion and polyaniline nanofiber, Journal of Power Sources, vol. 157, Issue 2, Jul. 2006, pp. 703-708.*

Toshikatsu Sata, Yuuko Ishii, Kohei Kawamura, and Koji Matsusaki, Composite Membranes Prepared from Cation Exchange Membranes and Polyaniline and Their Transport Properties in Electrodialysis, Journal of the Electrochemical Society, 146 (2) 585-591 (1999).*

Aguilar et al., "Use of nanofiltration for potable water from an aquifer recharged with wastewater", Water Science and Technology, 2008, 6(57), 927-933.

Causley et al., "Electrochemically-induced fluid movement using polypyrrole", Synthetic Metals, May 31, 2005, 151(1), 60-64.

Chen et al., "Conductive Super-Hydrophobic Surfaces of Polyaniline Modified Porous Anodic Alumina Membranes", Journal of Nanoscience and Nanotechnology, Mar. 2006, 6(3), 783-786.

Cui etal., "Preparation and application of zeolite/ceramic microfiltration membranes for treatment of oil contaminated water", Journal of Membrane Science, Nov. 15, 2008, 325(1), 420-426.

Gharibi et al., "Study of polyaniline doped with trifluoromethane sulfonic acid in gas-diffusion electrodes for proton-exchange membrane fuel cells", Journal of Power Sources, Apr. 2006, 155(2), 138-144.

International Patent Application No. PCT/CN2010/079777: International Search Report dated Sep. 29, 2011, 13 pages.

Koh et al., "Surface modification of polytetrafluoroethylene by Ar+ irradiation for improved adhesion to other materials", Journal of Applied Polymer Science, Jun. 6, 1997, 64(10), 1913-1921.

Kurosawa et al., "Supercritical carbon dioxide processing of conducting composites of polypyrrole and porous crosslinked polystyrene", Polymer, Apr. 19, 2006, 47(9), 2997-3004.

Lehman et al., "Application of ceramic membranes with pre-ozonation for treatment of secondary wastewater effluent", Water research, Apr. 2009; 43(7), 2020-2028.

Lunkwitz et al., "Modification of fluoropolymers by means of electron beam irradiation", Radiation Physics and Chemistry, 2000, 57, 373-376.

Tao et al., The Effect of Oxidant on Structure and Properties of PAn/PTFE Conducting Composite Membrane, Journal of Electrochemistry, May 2005, 11(2), 208-214.

Tian et al., "Hydrophilic modification of PTFE membrane by in-situ polymerization-deposited polyaniline", Membrane Science and Technology, Dec. 2009, 29(6), 40-44.

Whittle, "Electrically conductive polymer and polymer composites for use in water treatment, fuel cells and electronics", www.invenia.es/tech:05_gb_lsdd_0bno, accessed Dec. 14, 2011, 4 pages.

Wu et al., "Surface Modification of Poly(tetrafluoroethylene) Films by Graft Copolymerization for Adhesion Improvement with Evaporated Copper", Macromolecules, 1999, 32(1), 186-193.

Wu, "Pleated Polytetrafluoroethylene Membrane Filter Cartridges", www.tradekey.com/product_view/id/181340.htm, accessed Dec. 14, 2011, 3 pages.

Yamada et al., "Surface Modification of Poly(tetrafluoroethylene) by Remote Hydrogen Plasma", Macromolecules, 1996, 29(12), 4331-4339.

Zhou et al., "Conducting Polyanilinelpoly(tetrafluoroethylene) Composite Films with Tunable Surface Morphology and Hydrophilicity", Synthetic Metals, Sep. 2010, 160(17-18), 1925-1930.

Asthana, R., and Sobczak, N., "Wettability, Spreading, and Interfacial Phenomena I High-Temperature Coatings," Journal of the Minerals, Metals & Materials Society, vol. 52, No. 1, pp. 20, Jan. 2000.

* cited by examiner

COMPOSITE MEMBRANES

CROSS-REFERENCE TO RELATED APPLICATION

This application is the U.S. National Stage filing under 35 U.S.C. §317 of International Application No. PCT/CN2010/079777, filed Dec. 14, 2010, the disclosure of which is incorporated herein by reference in its entirety.

TECHNICAL FIELD

The present disclosure generally relates to composite membranes and processes for their production and use.

BACKGROUND

In recent years, a variety of wastewater treatment technologies have emerged, which use chemical, physical chemical, and biological methods to remove contaminants from wastewater.

Membrane water filtration technology has been increasingly used in contaminant removal systems due to its high efficiency, relatively low energy usage, simplified equipment and ease of operation. New membranes are the focus of continuous R&D efforts, such as ultra-filtration membranes, microfiltration membranes, nano-filtration membranes, ceramic membranes and ion-exchange membranes. These membranes may not only fully recover valuable resources in wastewater, but also advance the depth of wastewater treatment with significant environmental and economic benefits. However, the complexity of the manufacturing process, their relatively high price, and possibility of secondary contamination limits the widespread applications of membrane separation technology in wastewater treatment. Furthermore, at present, membranes with dual functions of filtration (of water impurities) and adsorption (of heavy metal ions) remain untapped.

The membranes used in wastewater treatment have to withstand rather harsh chemical conditions. Materials such as polytetrafluoroethylene (PTFE) for example, exhibit good resistance to chemical corrosion and are hydrophobic, are insulating, insoluble and exhibit non-adhesive or "anti-sticking" properties. PTFE films have been mainly used in gas-solid separation, dust collection, air purification, and as porous waterproof coatings on clothing. However, because of their strong hydrophobicity, PTFE films cannot be used in water filtration. Therefore, to produce PTFE composite membranes for use in water filtration, the PTFE films are typically subjected to plasma processing followed by grafting modification of hydrophilic functional monomers. The PTFE films can also be irradiated and compounded together with hydrophilic polymers. However, these processes are both complex and costly. Furthermore, plasma treatment of the PTFE films may undermine the internal structure of the membrane and decrease the membrane mechanical strength.

Another known process for producing composite membranes for use in water filtration employs electro-polymerization to polymerize hydrophilic monomers onto a non-conductive polymer support. However, due to the non-conductive nature of such polymer supports, the rate of electro-polymerization is comparatively lower than that of chemical polymerization. Furthermore, the extent of electro-polymerization is limited by the size of the electrode used. Therefore, such processes are difficult to scale-up and have limited industrial applications.

SUMMARY

According to a first aspect, there is provided a composite membrane which includes a porous halogenated polymer that is coated with a coupling agent on its surface and a conductive polymer coupled to the porous halogenated polymer. The halogenated polymer may be a fluorinated polymer.

According to a second aspect, there is provided a method for producing a composite membrane which includes coupling a conductive polymer and a porous halogenated polymer that is coated with a coupling agent on its surface. The halogenated polymer may be a fluorinated polymer.

According to a third aspect, there is provided a water treatment system for removing contaminants in water, the system includes: an enclosed chamber for containing water feed therein; a composite membrane which includes a porous halogenated polymer that is coated with a coupling agent on its surface and a conductive polymer coupled to the porous halogenated polymer mounted within the enclosed chamber for being substantially immersed in the water feed; and a pressure differential source to drive at least part of the water feed across the membrane and produce treated water having less contaminants relative to the feed water. The pressure differential source may be a vacuum.

According to a fourth aspect, there is provided a method of removing metal ions in solution, which includes passing a water feed containing the metal ions through a composite membrane which includes a porous halogenated polymer that is coated with a coupling agent on its surface and a conductive polymer coupled to the porous halogenated polymer.

According to a fifth aspect, there is provided a metal removal system for the adsorption of metal ions in solution, the system includes: an enclosed chamber for containing a feed solution comprising the metal ions in solution therein; a composite membrane which includes a porous halogenated polymer that is coated with a coupling agent on its surface and a conductive polymer coupled to the porous halogenated polymer mounted within the enclosed chamber for being substantially immersed in the feed solution; and a pressure differential source to drive at least part of the water feed across the membrane to thereby at least partially adsorb the metal ions therein and to produce treated water having less metal ions relative to the feed water. The pressure differential source may be a vacuum.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 2b is an X-ray diffraction graph of the composite membrane of FIG. 2a.

DETAILED DESCRIPTION

Figure 1A:
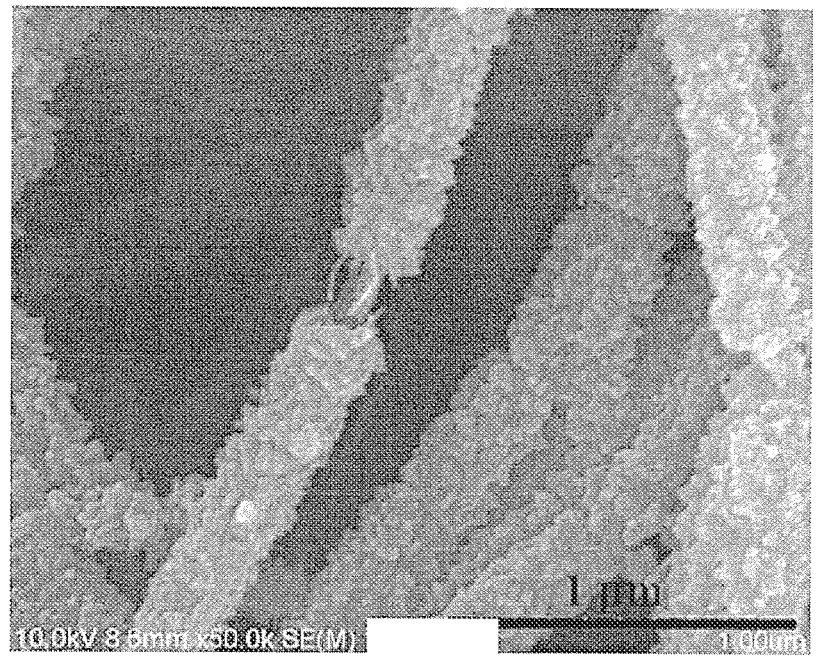
FIG. 1a is a Scanning Electron Microscopic (SEM) image obtained at 50,000× magnification of the composite membrane produced from Example 1.

The illustrative embodiments described in the detailed description, any drawings, and claims are not meant to be limiting. Other embodiments may be utilized, and other changes may be made, without departing from the spirit or scope of the subject matter presented herein. It will be readily understood that the aspects of the present disclosure, as generally described herein, and that may be illustrated in any Figures, can be arranged, substituted, combined, separated, and designed in a wide variety of different configurations, all of which are explicitly contemplated herein.

The following words and terms used herein shall have the meaning indicated:

The term "halogenated polymer" as used herein refers to homopolymers or copolymers derived at least in part from monomers substituted by one or more halogen atoms.

The term "fluorinated polymer" as used herein refers to homopolymers or copolymers derived at least in part from monomers substituted by one or more fluorine atoms, or substituted by a combination of fluorine atoms and at least one chlorine, bromine or iodine atom per monomer. Exemplary fluorinated homopolymers and copolymers include polymers and copolymers prepared from tetrafluoroethylene, hexafluoropropylene, chlorotrifluoroethylene and bromotrifluoroethylene.

The term "conductive polymer" used herein refers to polymers that exhibit the property of being able to conduct electricity. The conductivity of conductive polymers is related to the abundance of charge-carrying polarons (cation radicals) and bipolaron (di-cation) structures present on the polymer backbone.

The terms "hydrophilic" or "hydrophilicity", when referring to a surface, are to be interpreted broadly to include any property of a surface that causes a water droplet to substantially spread across it. Generally, if the contact angle between a water droplet and the surface is smaller than 90°, the surface is hydrophilic or exhibits hydrophilicity. The water droplet may be replaced with any liquid that is miscible with water. Accordingly, the contact angle between a liquid miscible with water and a hydrophilic surface is also smaller than 90°. Exemplary liquids that are miscible with water are ethanol, acetone and tetrahydrofuran. The term "superhydrophilic" refers to when the contact angle between a water droplet and the surface is smaller than 5°.

The terms "hydrophobic" and "hydrophobicity", when referring to a surface, are to be interpreted broadly to include any property of a surface that does not cause a water droplet to substantially spread across it. Generally, if the contact angle between a water droplet and the surface is greater than 90°, the surface is hydrophobic or exhibits hydrophobicity. The water droplet may be replaced with any liquid that is miscible with water. Accordingly, the contact angle between a liquid miscible with water and a hydrophobic surface is also greater than 90°. Exemplary liquids that are miscible with water are ethanol, acetone and tetrahydrofuran.

The term "lipophilic", when referring to a surface, is to be interpreted broadly to include any property of a surface that causes a hydrophobic solvent droplet to substantially spread across it. Generally, if the contact angle between a hydrophobic solvent droplet and the surface is smaller than 90°, the surface is lipophilic. Exemplary hydrophobic solvents are hexane, toluene and trichloromethane.

The term "amphiphilic", in the context of this specification, refers to a surface that has both a water contact angle of less than 90° and a hydrophobic solvent contact angle of less than 90°.

The term "contact angle", in the context of this specification, is to be interpreted broadly to include any angle that is measured between a liquid/solid interface. The contact angle is system specific and depends on the interfacial surface tension of the liquid/solid interface. A discussion on contact angle and its relation to surface wetting properties can be seen from "Wettability, Spreading, and Interfacial Phenomena in High-Temperature Coatings" by R. Asthana and N. Sobczak, JOM-e, 2000, 52 (1). The contact angle can be measured from two directions. In the context of this specification, for a longitudinal imprint being disposed about a longitudinal axis, θx refers to the contact angle measured in the "X" direction being perpendicular to the longitudinal axis and θy refers to the contact angle measured in the "Y" direction parallel, or in alignment with, the longitudinal axis. The value of the contact angle, θx or θy, may indicate the hydrophobicity or hydrophilicity of a surface. The difference of these two contact angles, represented by Δθ (where Δθ=θy−θx), indicates the degree of isotropy or anisotropy of a wetting property.

The word "substantially" does not exclude "completely" e.g. a composition which is "substantially free" from Y may be completely free from Y. Where necessary, the word "substantially" may be omitted from the definition of the disclosed embodiments.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Non-limiting embodiments of a composite membrane will now be disclosed.

In one embodiment, the coupling agent includes nucleophilic groups. In one embodiment, halogen atoms are selected from the nucleophilic groups. In one embodiment, the halogen atoms are fluorine atoms. In one embodiment, the coupling agent is NAFION®.

In one embodiment, the halogenated polymer is a fluorinated polymer or perfluorinated polymer.

The porous halogenated polymer of the composite membrane may exhibit good resistance to chemical corrosion, good mechanical strength and thermal stability relative to known conductive polymers. The conductive polymer of the composite membrane may be insoluble and may also exhibit thermal stability. Accordingly, the composite membrane is able to withstand harsh acidic and alkaline environments. Thus, the composite membrane can be used in a variety of complex treatment environments. In one embodiment, the composite membrane does not give rise to secondary contamination, such as membrane fouling.

In one embodiment, the conductive polymer includes a dopant selected to enhance the hydrophilicity of the conductive polymer. In another embodiment, the dopant includes an acid. In yet another embodiment, the acidic dopant is at least one of an inorganic acid and an organic acid. In one embodiment, the inorganic acid dopant is selected from the group consisting of hydrochloric acid, sulfuric acid, phosphoric acid and nitric acid. In another embodiment, the organic acid dopant is selected from carboxylic acid and sulfonic acid. In one embodiment, the organic acid dopant is selected from the group consisting of straight chain aliphatic carboxylic acids, straight chain aliphatic sulfonic acids, aromatic carboxylic acids and aromatic sulfonic acids. The organic acid dopant may be acetic acid, butyric acid, benzoic acid or toluenesulfonic acid.

Doping of the conductive polymer may render the composite membrane hydrophilic. On the other hand, an undoped conductive polymer may render the composite membrane hydrophobic. In one embodiment, the hydrophilicity of the conductive polymer is capable of being altered by neutralizing the dopant. In another embodiment, the hydrophilicity of the conductive polymer is capable of being altered when a voltage is applied across the composite membrane and an inert electrode in an electrolyte solution. The hydrophilicity of the conductive polymer may be altered instantaneously when the voltage applied is sufficient. The doping of the conductive polymer may be made reversible by altering the polarity of the voltage applied, thus enabling easy control of the hydrophilicity of the composite membrane. The composite membrane may have properties of both super-hydrophilicity and electrical conductivity. Accordingly, the composite membrane can perform dual functions of water filtration and heavy metal ion adsorption.

The hydrophilicity of the composite membrane may also be dependent on other factors, such as the surface morphology, roughness and thickness of the conductive polymer layer.

In one embodiment, the composite membrane is water-permeable.

In one embodiment, the composite membrane is amphiphilic.

In one embodiment, the conductive polymer is coupled co-axially to the porous halogenated polymer.

In one embodiment, the conductive polymer includes an oxidant to enhance the hydrophilicity of the conductive polymer. In one embodiment, the oxidant may be a strong or mild oxidant. Exemplary oxidants include ammonium persulfate, ferric chloride, ferric nitrate, cerium ammonium nitrate, chloroauric acid, silver nitrate, sodium hypochlorite and hydrogen peroxide. In one embodiment, the molar ratio of oxidant to the monomeric groups is in the range of about 1:1 to about 20:1. In another embodiment, the molar ratio of oxidant to the monomeric groups is in the range of about 1:1 to about 5:1.

The use of porous halogenated polymers confers excellent chemical inertia, thermal stability and good mechanical strength on the resultant composite membrane. In one embodiment, the porous fluorinated polymer is selected from the group consisting of polytetrafluoroethylene, fluorinated-ethylenepropylene, perfluoroalkoxys, polychlorotrifluoroethylene, ethylene tetrafluoroethylene, and polyvinylidene fluoride. In one embodiment, the porous fluorinated polymer is polytetrafluoroethylene (PTFE).

In one embodiment, the conductive polymer is any charged polymer and may include polypyrrole, polyaniline, polythiophene, polyacetylene, polyaromatic amines, and derivatives thereof.

The composite membrane may be made conductive by controlling the mass of the conductive polymer grown on the porous fluorinated polymer. In one embodiment, the mass of conductive polymer relative to the composite membrane is in the range of about 1% to about 30%. In another embodiment, the mass of conductive polymer relative to the composite membrane is in the range of about 2% to about 10%.

In one embodiment, the conductive polymer may be in the form of a layer. In this embodiment, the composite membrane may also be made conductive by controlling the thickness of the conductive polymer layer such that the thickness of the conductive polymer layer is in the range of about 2 μm to about 10 μm.

The mass of the conductive polymer and thickness of the conductive polymer layer as stated above may be adjusted simultaneously with each other to render the composite membrane conductive.

In one embodiment, there is disclosed a method for producing a composite membrane which includes coupling a conductive polymer that is coated with a coupling agent on its surface and a porous halogenated polymer. In one embodiment, the porous halogenated polymer is a porous fluorinated polymer or a porous perfluorinated polymer. In one embodiment, the polymer is water permeable.

In one embodiment, the method for producing a composite membrane includes coupling a conductive polymer and a porous halogenated polymer that is coated with a coupling agent on its surface. In one embodiment, the method includes providing nucleophilic groups in the coupling agent. In one embodiment, the method includes selecting halogen atoms from the nucleophilic groups. In one embodiment, the method includes selecting fluorine atoms from the halogen atoms.

In one embodiment, the method does not undermine the internal structure of the composite membrane, so that the resultant composite membrane retains the original mechanical strength of the porous halogenated polymer. The method may be relatively simple and economical.

The conductive polymer may be coupled to the porous halogenated polymer via a physical coupling. The physical coupling may include hydrogen bond interactions, Van Der Waals interactions and ionic interactions.

In one embodiment, the coupling step includes polymerizing a monomeric solution of monomers capable of forming conductive polymers on the porous halogenated polymer. The membrane pore size of the resultant composite membrane may be manipulated by the degree of polymerization of the monomers on the porous fluorinated polymer.

In a further embodiment, the method includes providing a dopant in the monomeric solution for enhancing the hydrophilicity of the conductive polymers after the polymerization step. In one embodiment, the dopant is selected from inorganic and organic acids. The hydrophilicity or hydrophobicity of the resultant composite membrane may be controlled by the amount of dopant added. Accordingly, the resultant composite membrane may be amphiphilic. Thus, the resultant composite membrane may be used in water systems, oil systems, as well as other complex solvent systems.

In one embodiment, the method further includes providing an oxidant to the monomeric solution for enhancing the hydrophilicity of the conductive polymers after the polymerization step. In one embodiment, the oxidant is a strong or mild oxidant. In another embodiment, the oxidant is selected from the group consisting of ammonium persulfate, cerium ammonium nitrate, chloroauric acid, sodium hypochlorite, hydrogen peroxide, silver nitrate and ferric salts. In one embodiment, the oxidant may function as a dopant. Alternatively, in one embodiment the dopant may function as an oxidant.

The hydrophilicity or hydrophobicity of the resultant composite membrane may be controlled by the amount of oxidant added. The hydrophilicity or hydrophobicity of the resultant composite membrane may also be controlled by the molar ratio of the oxidant to monomer.

The rate of addition of the oxidant and the amount of oxidant added may alter the speed of the polymerization reaction, thereby controlling the growth of the conductive polymers on the porous fluorinated polymer. Accordingly, these microscopic structures formed on the porous fluorinated polymer alter the surface morphology of the conductive polymer and ultimately, the hydrophilicity of the composite membrane, as mentioned above. The growth of conductive polymers on the porous fluorinated polymer may also be altered by varying the type of oxidants added. The amount of deposition of conductive polymers on the porous fluorinated polymer ultimately determines the quality of the composite membrane. The pore size of the resultant composite membrane may be manipulated by the degree of polymerization. In one embodiment, the pore size of the resultant composite membrane may be from about 0.01 μm to about 1 μm, about 0.02 μm to about 1 μm, about 0.04 μm to about 1 μm, about 0.06 μm to about 1 μm, about 0.08 μm to about 1 μm, about 0.1 μm to about 1 μm, about 0.5 μm to about 1 μm, about 0.01 μm to about 0.5 μm, about 0.01 μm to about 0.1 μm, about 0.01 μm to about 0.08 μm, about 0.01 μm to about 0.06 μm, about 0.01 μm to about 0.04 μm or about 0.01 μm to about 0.02 μm. In another embodiment, the pore size of the resultant composite membrane may be from about 0.01 μm to about 0.1 μm.

In one embodiment, the coupling step includes contacting the porous fluorinated polymer with the monomeric solution. In one embodiment, the contacting step is undertaken for about 2 hrs to about 72 hrs. In one embodiment, the contacting step is undertaken for about 24 hrs to about 48 hrs. In another embodiment, the contacting step is undertaken at a temperature in the range of about −10° C. to about 35° C. In one embodiment, the contacting step is undertaken at a temperature in the range of about 0° C. to about 25° C.

In one embodiment, the method further includes: providing an acidic dopant in the monomeric solution; and polymerizing the conductive monomer to form the conductive polymer on the porous fluorinated polymer, whereby the conductive polymer is rendered generally hydrophilic by the acidic dopant.

Under the appropriate reaction conditions, the monomers in the monomeric solution may polymerize and deposit as a solid onto the porous fluorinated polymer to form the conductive polymer. The solid conductive polymer may neither dissolve nor melt.

In one embodiment, the porous fluorinated polymer is dried at a temperature in the range of about 40° C. to about 80° C. to produce the composite membrane. In another embodiment, the porous fluorinated polymer is dried at a temperature in the range of about 50° C. to about 60° C. to produce the composite membrane. In one embodiment, at least the acidic dopant disposed on at least the surface of the conductive polymer is neutralized to form a generally hydrophobic surface on the conductive polymer.

In one embodiment, the coupling step further includes coating the porous halogenated polymer with a coupling agent on its surface. In one embodiment, the coupling step includes providing nucleophilic groups in the coupling agent. In a further embodiment, the coupling step includes selecting halogen atoms from the nucleophilic groups. In another embodiment, the coupling step includes selecting fluorine atoms from the halogen atoms.

In one embodiment, the coupling agent is NAFION®. The sulfonated groups of NAFION® alter the surface properties of the porous fluorinated polymer, which aids in the growth of the conductive polymer on the porous fluorinated polymer. Accordingly, the composite membrane produced by this embodiment may possess stronger ionic interaction and therefore, may possess stronger coupling between the conductive polymer and the porous halogenated polymer.

In one embodiment, the method includes altering the hydrophilicity of the composite membrane between a hydrophilic state and a hydrophobic state. In another embodiment, the altering step includes applying a voltage across the composite membrane and an inert electrode in an electrolyte solution.

The disclosed composite polymer can be used to remove contaminants from liquid phases. In one embodiment, the pore size of the composite membrane used for the removal of contaminants may be from about 0.01 μm to about 1 μm.

In one embodiment, the disclosed composite polymer can be used to remove metal ions from liquid phases. For example, the composite membrane could be used to remove contaminants from water contaminated with metal ions such as heavy metal ions through redox reactions or even to recover precious metals such as silver and gold from liquid phases containing such precious metals. In such an embodiment, there is disclosed a system which includes: an enclosed chamber for containing a feed solution comprising the metal ions in solution therein; a composite membrane which includes a porous halogenated polymer that is coated with a coupling agent on its surface and a conductive polymer coupled to the porous halogenated polymer mounted within the enclosed chamber for being substantially immersed in the feed solution; and a pressure differential source to drive at least part of the water feed across the membrane to thereby at least partially adsorb the metal ions therein and to produce treated water having less metal ions relative to the feed water. The pressure differential source may be a vacuum. In one embodiment, the pore size of the composite membrane used for the removal of metal ions may be from about 0.01 μm to about 0.1 μm.

An outgoing water stream may contain less metal ions than the water feed. Metal ions in the water feed may undergo redox reactions and deposit onto the composite membrane. The reduced metal depositions may be subsequently recovered by techniques known in the art.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

EXAMPLES

Non-limiting examples of the invention will be further described in greater detail by reference to specific Examples, which should not be construed as in any way limiting the scope of the disclosed embodiments.

Example 1

Polymerization

A 30 cm$^2$ PTFE membrane (Sinoma Science & Technology Co. Ltd, Nanjing, China) was soaked in 10 mL of aniline monomer (analytically pure grade, from Shanghai Experiment Reagent Co. Ltd, of Shanghai, China) for 10 minutes. The membrane was then immersed in an aqueous solution containing 0.5 g of ammonium persulfate (analytically pure grade, from Nanjing Chemical Reagent Co. Ltd, of Nanjing, China) and 5 g of p-toluenesulfonic acid (analytically pure grade, from Shanghai Ling Feng Chemical Reagent Co. Ltd, of Shanghai, China) for 24 hours at 0° C. The membrane was removed and rinsed with distilled water and ethanol (analytically pure grade, from Nanjing Chemical Reagent Co. Ltd, of Nanjing, China), and dried. The resulting composite membrane is a PTFE membrane with doped polyaniline and exhibits an electrical conductivity of $10^0$ s/cm, a water contact angle of 105-110°, and a contact angle of 0° for the following solvents: n-hexane, tetrahydrofuran, ethanol, acetone, trichloromethane and toluene.

An SEM image of the resulting composite membrane obtained at 50,000× magnification is shown in FIG. 1a.

Neutralization

The resulting composite membrane is rendered hydrophobic by neutralizing the doped polyaniline to undoped polyaniline, either by immersing the composite membrane in 1 M ammonia for 24 hours or immersing the composite membrane in 0.1 M sodium sulphate electrolyte solution (analytically pure grade, from Nanjing Chemical Reagent Co. Ltd, of Nanjing, China) with a 30 V voltage applied to the solution. The resulting membrane has a water contact angle of 140-145°.

Example 2

Polymerization

Here, the process of Example 1 is carried out, except that 1 g of ammonium persulfate is used instead of 0.5 g of ammonium persulfate. The resulting hydrophilic composite membrane exhibits an electrical conductivity of $10^0$ s/cm, a water contact angle of 55-60°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 is carried out, except that 0.5 M sodium nitrate electrolyte solution is used. The resulting membrane has a water contact angle of 140-145°.

Example 3

Polymerization

Here, the process of Example 1 is carried out, except that 1.5 g of ammonium persulfate is used instead of 0.5 g of ammonium persulfate. The resulting super-hydrophilic composite membrane exhibits an electrical conductivity of $10^0$ s/cm, a water contact angle of 0°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 is carried out, except that 1 M lithium perchlorate electrolyte solution (analytically pure grade, from Nanjing Chemical Reagent Co. Ltd, of Nanjing, China) is used. The resulting membrane has a water contact angle of 140-145°.

Example 4

Polymerization

A PTFE membrane was first coated with NAFION® solution (DE520, from DuPont of Wilmington, Del. of the United States of America), and then soaked in 1 M HCl (analytically pure grade, from Suqian Luen Shing Chemical Co. Ltd, of Jiangsu, China) for 24 h. The membrane was used to compartmentalize a reaction container into two separate compartments. The first compartment contained solution of 2.3 g ammonium persulfate in 50 mL distilled water and was placed against a first face of the membrane, and the second compartment contained a solution of 265 mL aniline and 1.7 g p-toluenesulfonic acid in 50 mL distilled water and was placed against the opposite second face of the membrane. The solutions were let to react with the membrane at room temperature for 72 h before the membrane was removed and washed several times with distilled water. The resulting amphiphilic PTFE/NAFION®/polyaniline composite membrane exhibited an electrical conductivity of $10^{-1}$ s/cm, a water contact angle of 0 to 5°, and a contact angle of 0° for the following solvents: n-hexane, tetrahydrofuran, ethanol, acetone, trichloromethane, and toluene.

Figure 1B:
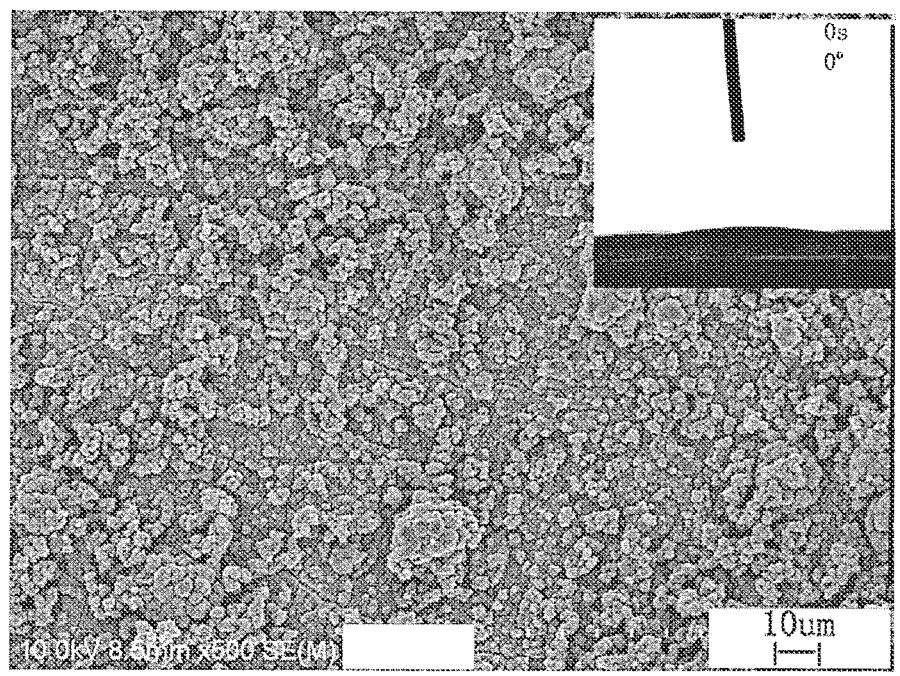
FIG. 1b is a Scanning Electron Microscopic (SEM) image obtained at 500× magnification of the composite membrane produced from Example 4.

An SEM image of the resulting composite membrane obtained at 500× magnification is shown in FIG. 1b.

Neutralization

The resulting composite membrane was rendered hydrophobic by neutralizing the doped polyaniline to undoped polyaniline, either by immersing the composite membrane in 1 M ammonia for 24 hours or immersing the composite membrane in 0.1 M potassium sulfate electrolyte solution (analytically pure grade, from Nanjing Chemical Reagent Co. Ltd, of Nanjing, China) with a 30 V voltage applied to the solution. The resulting membrane has a water contact angle of 130-145°.

Example 5

Polymerization

Here, the polymerization process of Example 4 was carried out, except that the second compartment contained 1 M HCl, instead of 1.7 g p-toluenesulfonic acid. The resulting amphiphilic PTFE/NAFION®/polyaniline composite membrane exhibited an electrical conductivity of $10^{-2}$ s/cm, a water contact angle of 15 to 20°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 was carried out, except that 1 M potassium nitrate electrolyte solution was used. The resulting membrane has a water contact angle of 130-145°.

Example 6

Polymerization

Here, the polymerization process of Example 4 was carried out, except that the reaction time was decreased to 48 h, instead of 72 h. The resulting amphiphilic PTFE/NAFION®/polyaniline composite membrane exhibited an electrical conductivity of $10^{-2}$ s/cm, a water contact angle of 10 to 15°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 was carried out, except that 1 M of potassium sulfate electrolyte solution was used. The resulting membrane has a water contact angle of 130-145°.

Example 7

Polymerization

Here, the polymerization process of Example 4 was carried out, except that the second compartment contained 0.6 g p-toluenesulfonic acid, instead of 1.7 g p-toluenesulfonic acid. The resulting amphiphilic PTFE/NAFION®/polyaniline composite membrane exhibited an electrical conductivity of $10^{-3}$ s/cm, a water contact angle of 80 to 85°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 was carried out, except that 0.5 M potassium sulfate electrolyte solution was used. The resulting membrane has a water contact angle of 130-145°.

Example 8

Polymerization

Here, the polymerization process of Example 4 was carried out, except that the second compartment contained 0.3 g p-toluenesulfonic acid, instead of 1.7 g p-toluenesulfonic acid. The resulting amphiphilic PTFE/NAFION®/polyaniline composite membrane exhibited an electrical conductivity of $10^{-4}$ s/cm, a water contact angle of 90 to 95°, and a contact angle of 0° for the following solvents: n-hexane, tetrahydrofuran, ethanol, acetone, trichloromethane and toluene.

Neutralization

To produce the final hydrophobic membrane of Example 1, the neutralization process of Example 1 was carried out, except that 1 M lithium perchlorate electrolyte solution (analytically pure grade, from Nanjing Chemical Reagent Co. Ltd, of Nanjing, China) was used. The resulting membrane has a water contact angle of 130-145°.

Example 9

A 2 cm×2 cm PTFE/NAFION®/polyaniline composite membrane produced in accordance with Example 4 was immersed in 0.02M of silver nitrate ($AgNO_3$) solution for 1 hour. After 1 hour, the membrane was removed, dried and analyzed under a scanning electron microscope.

Figure 2A:
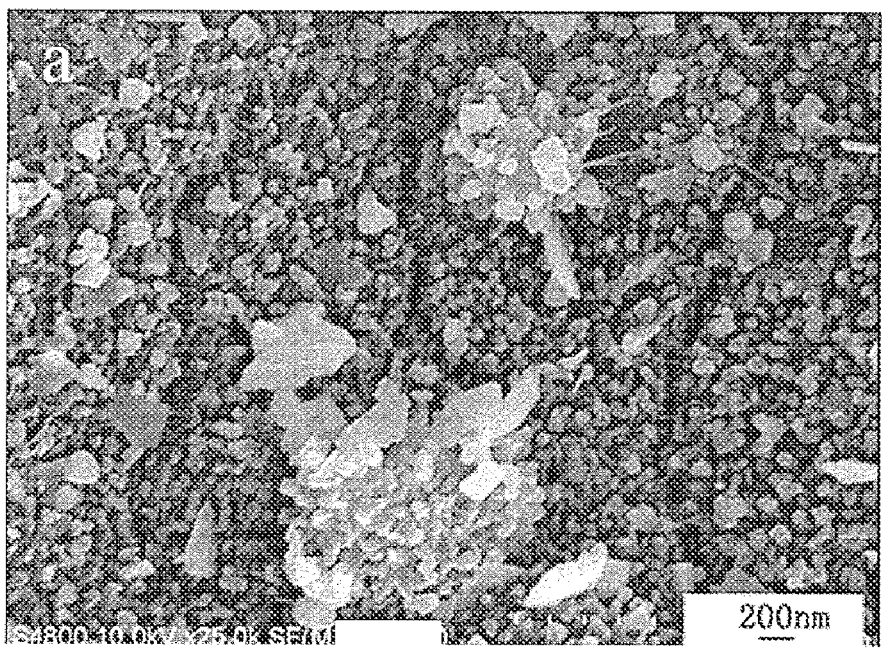
FIG. 2a is an SEM image obtained at 25,000× magnification of a PTFE/NAFION®/polyaniline composite membrane having silver nanoparticles adsorbed thereon in accordance to Example 9.

FIG. 2a shows an SEM image at 25,000× magnification of the PTFE/NAFION®/polyaniline composite membrane in which the adsorption of silver nanoparticles on the surface of the composite membrane can be observed.

Figure 2B:
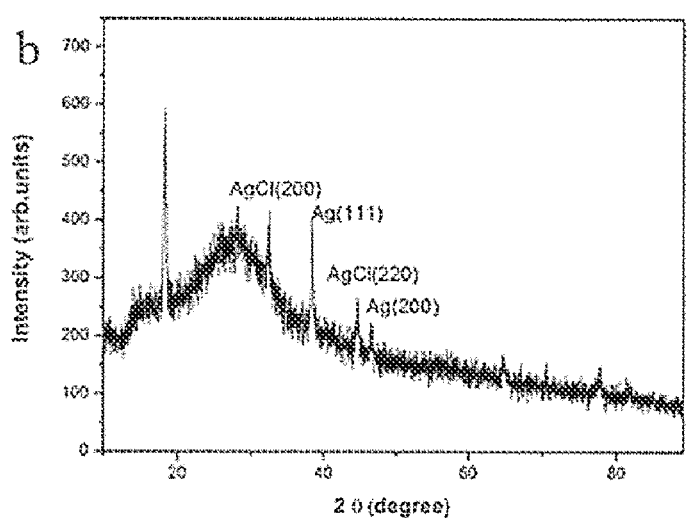

The silver nanoparticles were analyzed under an X-ray diffraction microscope and the X-ray diffraction graph produced is shown in FIG. 2b. Diffraction peaks for the Ag element can be seen on the graph, showing the adsorption of silver onto the composite membrane. This is due to the reduction of $Ag^+$ ions present in the $AgNO_3$ solution to Ag by the polyaniline of the composite membrane.

Example 10

Here, the process of Example 6 was carried out, except that the 2 cm×2 cm PTFE/NAFION®/polyaniline composite membrane was immersed in 0.02M of lead acetate ($Pb(CH_3COO)_2$) solution instead of $AgNO_3$ solution.

Figure 3:
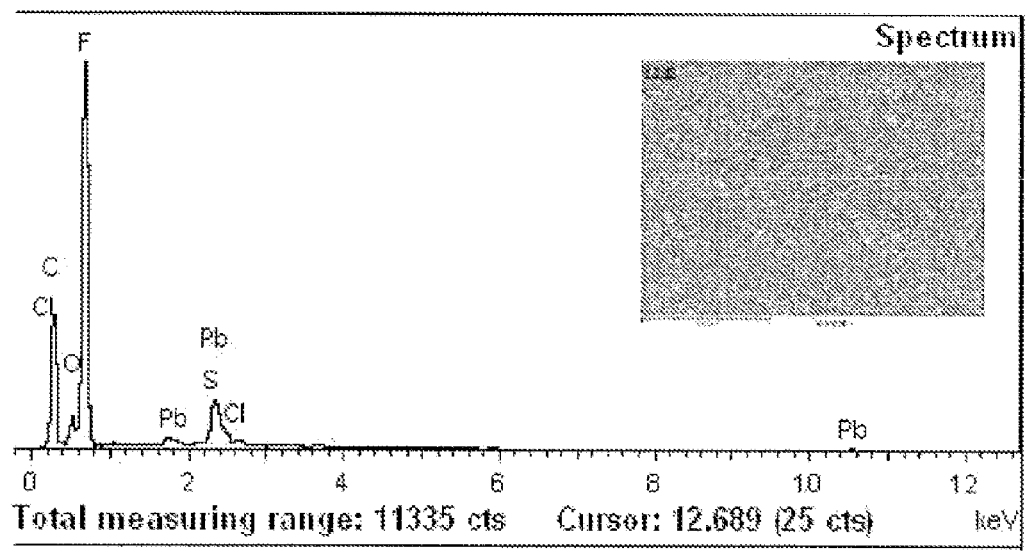
FIG. 3 is a multi-element analysis of the composite membrane after contact with a solution containing lead ions in accordance to Example 10.

After 1 hour, the membrane was analyzed and the multi-element analysis of the membrane is shown in FIG. 3. The elemental analysis indicates a peak for the Pb element and the weight of the adsorbed Pb accounts for 3.46% by weight of the total composite membrane. This shows that the $Pb^{2+}$ ions in the $Pb(CH_3COO)_2$ solution form an effective complex with the amino and imine groups of the polyaniline of the composite membrane which may result in the reduction of the $Pb^{2+}$ ions to Pb and the resultant adsorption of Pb onto the composite membrane.

Applications

The porous fluorinated polymer of the disclosed composite membrane may retain its original mechanical strength and its internal structure may not be undermined. Therefore, the disclosed composite membrane may be able to withstand harsh acid and alkali environments. The use of the disclosed composite membrane may thus be tailored to any relevant industrial application.

The disclosed composite membrane may not give rise to secondary contamination, such as membrane fouling.

The disclosed composite membrane may possess dual functions of both super-hydrophilicity and electrical conductivity. Accordingly, the disclosed composite membrane can be used in wastewater treatment as a membrane filter for impurities as well as to adsorb heavy metal ions. The membrane can also be used in the decontamination of acid systems and alkaline systems.

The hydrophilicity of the composite membrane may be modified in various ways. Accordingly, the disclosed composite membrane is amphiphilic and can be used in water systems, oil systems, as well as other complex solvent systems. The disclosed composite membrane may also be used for the enrichment of heavy metal ions.

The disclosed method may be relatively simple and economical.

The invention claimed is:

1. A composite membrane comprising three layers, the composite membrane comprising:
   a porous halogenated polymer;
   a coupling agent coated on a surface of the porous halogenated polymer, wherein the coupling agent comprises nucleophilic groups; and
   a conductive polymer layer including an electrically conductive polymer bound to the coupling agent, wherein:
      the conductive polymer and composite membrane have a native hydrophilicity or hydrophobicity when the conductive polymer is in an undoped state;
      the conductive polymer comprises a dopant including an acid that enhances the native hydrophilicity of the conductive polymer and the composite membrane;
      the conductive polymer layer has a thickness in a range of about 2 μm to about 10 μm; and
      a ratio of a weight amount of the conductive polymer relative to the composite membrane is in a range of about 1% to about 30%.

2. The composite membrane of claim 1, wherein:
   the conductive polymer is selected from the group consisting of polypyrrole, polyaniline, polythiophene, polyacetylene, polyaromatic amines, and derivatives thereof; and
   wherein the ratio of the weight amount of the conductive polymer relative to the composite membrane is in a range of about 2% to about 10%.

3. The composite membrane of claim 1, wherein the porous halogenated polymer comprises a fluorinated polymer selected from the group consisting of polytetrafluoroethylene, fluorinated-ethylenepropylene, perfluoroalkoxys, polychlorotrifluoroethylene, ethylene tetrafluoroethylene, and polyvinylidene fluoride.

4. The composite membrane of claim 1, wherein the hydrophilicity of the conductive polymer is capable of being altered by neutralizing the dopant.

5. The composite membrane of claim 1, wherein the dopant is neutralized to render the composite membrane hydrophobic.

6. The composite membrane of claim 1, wherein the conductive polymer comprises an oxidant to enhance the native hydrophilicity of the conductive polymer.

7. The composite membrane of claim 1, wherein the dopant consists of carboxylic acid, sulfonic acid, straight chain aliphatic carboxylic acids, straight chain aliphatic sulfonic acids, aromatic carboxylic acids, aromatic sulfonic acids, acetic acid, butyric acid, benzoic acid, or toluenesulfonic acid.

8. The composite membrane of claim 1, wherein the dopant is neutralized by immersing the composite membrane in a solution comprising a compound selected from the group consisting of sodium sulfate, sodium nitrate, lithium perchlorate, potassium sulfate, and potassium nitrate.

9. The composite membrane of claim 6, wherein the oxidant consists of ammonium persulfate, ferric chloride, ferric nitrate, cerium ammonium nitrate, chloroauric acid, silver nitrate, sodium hypochlorite or hydrogen peroxide.

10. The composite membrane of claim 1, wherein the coupling agent comprises halogen atoms.

11. The composite membrane of claim 10, wherein the coupling agent comprises fluorine atoms.

12. The composite membrane of claim 1, wherein the coupling agent comprises sulfonated groups.

* * * * *